Oct. 21, 1941.     W. E. SEARS     2,260,059
FISHING BOB
Filed May 8, 1940
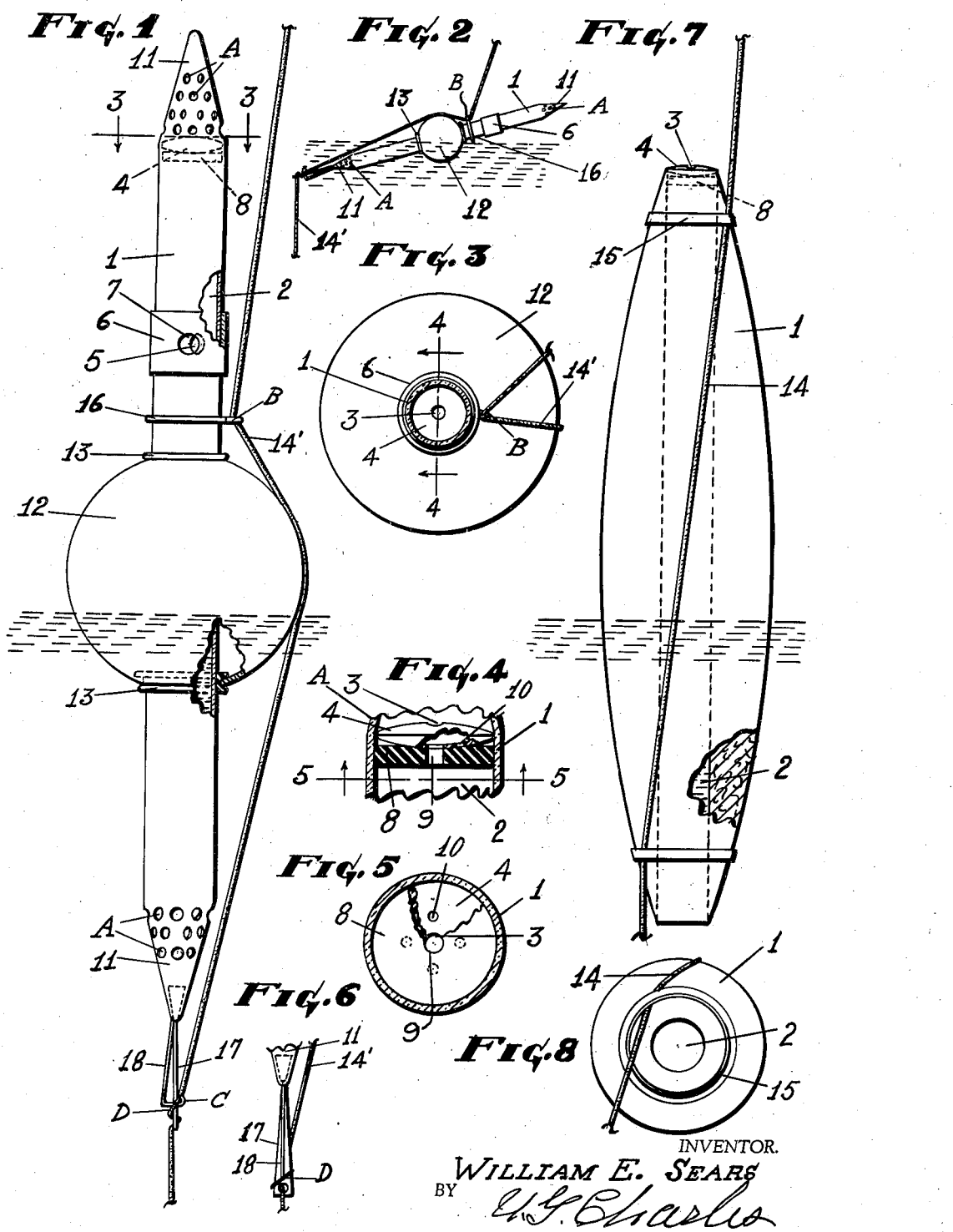
INVENTOR.
WILLIAM E. SEARS
BY
ATTORNEY.

Patented Oct. 21, 1941

2,260,059

UNITED STATES PATENT OFFICE 2,260,059

FISHING BOB

William E. Sears, Eureka, Kans.

Application May 8, 1940, Serial No. 333,991

4 Claims. (Cl. 43—17)

My invention relates to new and useful improvements in fishing bobs, and has for its principal object an audible feature produced by movement of the bob in the water, it being assumed that the jerk of a fish will effect the movement required for audibility, and to this end my invention was intended and especially for night or subdued day light fishing.

A further object of my invention is to produce a fishing bob that is hollow and subject to being partially filled with water after the bob is cast, the unfilled portion of the hollow to function as a compression chamber to exhaust through a whistle as the water rises in the hollow, it being understood that a hook and a sinker are the medium for the vertical position of the bob.

A still further object of my invention is to provide a fishing bob having its buoyant element slidable on a hollow tube, said tube functioning as an air chamber and operative as described in the second object, by which means the volume of compression may be increased or decreased by sliding the buoyant element on the tube.

A still further object of my invention is to provide an adjustable breather in the built up air chamber, whereby water wave movement, or a light jerk, will not produce audibility of the whistle, as such fluctuation within the compression chamber is free to exhaust through the said breather that is separate and distinct from the whistle structure.

A still further object of my invention is to place in the hollow of the bob an absorbent apertured disc in contact with the whistle to effect prompt drainage of water from the whistle, as otherwise, by capillary attraction, the orifices of the whistle would be sealed after submersion in water.

A still further object of my invention is to provide a hollow fishing bob, the entire body of which is of buoyant material, the hollow adapted to receive water therein in such a way as to seek its level with the surface of the water in which the bob is floating.

These and other objects will hereinafter be more fully explained, reference being had to the accompanying drawing forming a part of this specification, and in which like characters will apply to like parts in the different views.

Referring to the drawing:

Fig. 1 is a side view of the fish bob having an adjustable buoyant element.

Fig. 2 is a reduced side view of the bob at an inclined position for rocking movement as the bob is jerked.

Fig. 3 is a sectional view taken on line 3—3 in Fig. 1, looking in the direction of the arrows.

Fig. 4 is an enlarged sectional view taken on line 4—4 in Fig. 3, parts removed for convenience of illustration.

Fig. 5 is an inverted view taken on line 5—5 in Fig. 4.

Fig. 6 is a transverse view of the line hook-up to that shown in Fig. 1.

Fig. 7 is a side view of a hollow buoyant body as a bob.

Fig. 8 is a lower end view of Fig. 7.

My invention herein disclosed relates to a fishing bob consisting of a hollow tube 1, the hollow 2 being open at one end, and functioning as an air chamber when the tube is vertically disposed and partially submerged in water with its open end downward to fill the hollow of the tube without resistance, whereby the unfilled portion of the hollow will function as a compression chamber subject to fluctuation by the rise and fall of the bob, the surface of the water tending to seek its level at all times in the hollow of the tube, the exhaust for the air chamber portion being through orifices 3 of a whistle structure that are axially aligned, the structure preferably comprising a pair of concave discs 4, their concavities confronting each other, and being frictionally secured adjacent the upper end of the tube.

Whistles so constructed may be overpowered with a current of air which would debilitate an audible tone, and to accommodate for such condition, I have provided a breather through the medium of an aperture 5 in the shell of the tube a spaced distance downward or inward from the whistle. To control the breather, there is placed on the tube an annular collar 6 having an aperture 7 to register with the aperture in the shell of the tube, and by turning the collar on the tube the apertures may be closed or partially so, whereby the breather is varied for audibility of the whistle.

To avoid permanent flooding of the whistle when emerged from the water, there is placed inward of the whistle and in close proximity thereto a textile absorbent disc 8 axially apertured as at 9, registering with the orifices of the whistle, said disc to break capillarity at the lower orifice, causing free drainage of water from the concavity of the whistle, whereby capillary attraction at the upper orifice is broken by the drainage vacuum, and furthermore the lower concavity of the whistle has a plurality of apertures 10 spaced around the orifice of the lower concave disc, through which absorption will take place by the absorbent disc for an instant result to reinstate the capacity of the whistle, should the same be submerged by a repeated jerk of a fish, in which instance, the downward movement of the bob will cause the whistle to respond by rise of the water in the tube, and vice versa, as the water drops by an upward movement of the bob.

Positioned on the upper and lower ends of the tube is a conical cap 11, plurally apertured as at A, through which air and water is free to circulate, and the said caps may be integrally joined or removably applied, functioning as a strainer.

As a buoyant element for the tube, I have placed a spherical element 12 slideable thereon, whereby the extension of the tube at either end thereof from the buoyant element may be varied by sliding movement of said element on the tube, and while I have shown a hollow spherical structure, the same may be solid, as of cork, or other appropriate substance; if hollow, the axial openings through the tube are made fluid tight by gaskets 13 carried by the said buoyant element in its sliding movement.

In Fig. 7 is illustrated a bob comprised of a solid body of cork or like substance for buoyant purpose, and being hollow and having a whistle on its upper disposed end to function as that described for Fig. 1, the whistle being provided with a similar disc and for like purpose to that above described.

The fishing line 14 for the later described bob is secured by rings 15 slidably engaging therearound, adjacent each end and within which the line will frictionally engage between said rings and the shell of the tube, while line 14' is applied to the structure shown in Fig. 1 by a ring 16 having an eye B, in which the line will engage, and extending downward therefrom to be engaged by a clip axial with the conical cap to which it is secured, the clip to frictionally retain the line at a predetermined length for its fishing depth, said clip consisting of a plate 17, secured to the lower portion of the cap, extending downward and being apertured upward from its lower extremity, and a spring 18 having its upper end secured to the plate, while the lower end thereof is looped as at C to engage through the aperture to receive the line passing through the loop and retained by retraction of the spring to bind the line against the plate. Downward from the loop and its respective aperture is another aperture through which the line will engage after winding said line about the plate as at D adjacent last said aperture as an additional friction for the line against longitudinal movement.

While I have shown and described a tubular structure, the hollow of which is of equal diameter its entire length, I do not wish to be restricted to such alone, as the diameter of the hollow may vary following the contour of the tubular buoyant structure externally should the same be similar to that shown in Fig. 7, or forms varying therefrom, and the line as frictionally carried by the bob may be varied by passing the line eccentrically through the whistle and hollow of the bob, and means to maintain the line at a predetermined depth for fishing at the lower end of the bob; furthermore the clip as shown and described may be varied so long as the line has sufficient friction to retain the bob at a predetermined point thereon, and such other modifications may be employed as lie within the scope of the appended claims.

Having fully described my invention what I claim as new and desire to secure by Letters Patent is:

1. In fishing bobs, a tubular buoyant body, means to vertically position the said tubular body in water, whereby the tube is partially filled with water, the unfilled portion of the tube functioning as a compression chamber for a whistle, an orificed whistle secured in the compression chamber, a breather in the end portion of the tube adjacent the whistle communicating with the compression chamber to insure audible action of the whistle, and means to adjust the breather, and a line adjustably secured to the buoyant body as vertically supporting means therefor in the water so that when the said buoyant body is moved reciprocatingly on a vertical plane the displacement of the water in the tube will cause the whistle to respond audibly.

2. In fishing bobs as recited in claim 1, a conical apertured cap, as a strainer, secured to each end of the tube.

3. In fishing bobs as recited in claim 1, an absorbent disc fitting snugly in the tube adjacent the whistle, the disc being apertured axially as a drain for the whistle should the same become filled with water and to break capillary tension at the whistle's orifice.

4. In fishing bobs, a tube of a desired length, a strainer secured across each end of the tube, whereby water is free to circulate through the tube, an orificed wind whistle secured in the tube adjacent one end thereof, means to break capillary tension at the orifice of the whistle, a breather in the wall of the tube adjacent the whistle, and means to control exhaust of air through the breather to avoid excess air current through the whistle, a buoyant element adjustably carried by the tube intermediate of its ends whereby an upward extension of the tube as carried by the buoyant element may be varied to counterbalance the whistle, that is upwardly positioned from the buoyant body when the structure as a whole is cast into a body of water, and the portion of the tube between the water level and whistle to function as a compression chamber to exercise the whistle when the tube is moved on a vertical plane reciprocatingly, whereby the displacement of water in the tube will create vacuum or compressive force in the chamber which in turn will actuate the whistle audibly.

WILLIAM E. SEARS.